US005409328A

United States Patent [19]

Noda

[11] Patent Number: 5,409,328

[45] Date of Patent: Apr. 25, 1995

[54] DRILLING MACHINE FOR RAILROAD RAIL

[75] Inventor: Hirotoshi Noda, Kanagawa, Japan

[73] Assignee: Kabushiki Kaisha Yamazaki Haguruma Seisakusho, Kanagawa, Japan

[21] Appl. No.: 119,236

[22] PCT Filed: Feb. 22, 1993

[86] PCT No.: PCT/JP93/00213

§ 371 Date: Sep. 24, 1993

§ 102(e) Date: Sep. 24, 1993

[87] PCT Pub. No.: WO93/25759

PCT Pub. Date: Dec. 23, 1993

[30] Foreign Application Priority Data

Jun. 15, 1992 [JP] Japan .................................. 4-180418

[51] Int. Cl.[6] ........................ B23B 41/00; B23B 47/18; B23B 49/00

[52] U.S. Cl. ...................................... 408/100; 408/87; 408/111; 408/129

[58] Field of Search ...................... 408/87, 95, 99, 100, 408/103, 108, 110, 111, 115 R, 115 B, 101, 102, 77, 78, 129; 409/175, 178; 51/241 LG

[56] References Cited

U.S. PATENT DOCUMENTS 3,706,505 12/1972 Stougaard ............................ 408/95
3,945,749 3/1976 Mollrath .............................. 408/95

FOREIGN PATENT DOCUMENTS 25-8497 5/1924 Japan .
47-20778 9/1972 Japan .
48-110778 12/1973 Japan .
52-37692 3/1977 Japan .
53-7889 1/1978 Japan .
57-34355 2/1982 Japan .
61-284308 12/1986 Japan .
63-105862 5/1988 Japan .

*Primary Examiner*—Steven C. Bishop
*Attorney, Agent, or Firm*—Keck, Mahin & Cate

[57] ABSTRACT

A drilling machine for a railroad rail, in which the railroad rail is clamped crosswise with respect to a main body case by a catch frame and a clamp arm, includes a cutter advanced perpendicularly with respect to the middle part of the rail by turning the rotating handle of a link mechanism to drill boltholes is specific positions. The drilling position of the bolthole to be drilled in the middle part of the rail is set by a height gauge, secured on the catch frame, and a pitch gauge, mounted on the railroad rail.

1 Claim, 4 Drawing Sheets

DRILLING MACHINE FOR RAILROAD RAIL

BACKGROUND OF THE INVENTION

1. Field of the Invention

The present invention relates to a drilling machine that drills boltholes for fastening connecting plates on abutting railroad rails during the laying and repair of a railroad track.

2. Description of Related Art

Connecting plates are positioned for reinforcement on railroad rails and fastened to them with bolts during the laying of railroad track and the replacement of worn track. During this process, a specified number of boltholes are drilled in the middle part of the rail. However, since the drilling height and pitch of the bolt insertion holes on the connecting plates are predetermined for each type of rail, holes must be drilled in the rails to match the bolt insertion holes on the connecting plates.

The conventional method of drilling boltholes in railroad rails was to first determine the position of the holes to be drilled in each rail and then make punch marks, after which a drill was directed to the marks and the holes were drilled. Marking and punching each rail was tedious and handling the heavy drilling machine was a cumbersome task. There was thus a demand for a drilling machine capable of the simple and rapid operation needed when changing railroad rails in emergencies.

The present invention, devised out of the need to address such drawbacks present in the prior art, has, as its object, to provide a drilling machine for railroad rails that requires none of the marking and punching of conventional rail drilling procedures, and that permits simple and rapid adjustment of the drilling machine on, and drilling of, all types of rail.

SUMMARY OF THE INVENTION

The present invention, a drilling machine for railroad rails, has a configuration in which the rotating drive source 3 of a cutter for drilling 2 is housed in a main body case 1 and is secured in such a way that output shaft 4 extends outward and slide shafts 5, 5 are positioned along the sides of main body case 1. The rotating drive source 3 is centered between the slide shafts. A clamp arm 7 is provided with a support shaft permitting unobstructed movement opposite a catch frame 6, which is secured on the two output shaft ends 5a, 5a of slide shafts 5, 5. A clamping means is configured by a gripping surface 6*a* of catch frame 6 opposite a twin-tined hook member 7*a* below clamp arm 7 to grip a railroad rail 8 crosswise and from both sides. An upper rail support 9*c*, facing inward is secured on the inside of gripping surface 6*a* of catch frame 6, and a height gauge 10 with a through-hole 11 drilled approximately in its center is bolted to the same surface.

Two medial rail supports 9*a*, 9*a* are juxtaposed on the height gauge 10 with a gap between them, and various screw holes 12, 12, etc., into which upward rail supports 9*b*, 9*b* can be threaded to position them on height gauge 10, according to the designated drilling heights of boltholes 13 for each type of railroad rail, are provided on height gauge 10. A pitch gauge 20, on which numerous countersinks 21, 21, etc. are positioned in relation to the end of, or at a specified spot on, railroad rail 8 so as to correspond to the pitch designated for the boltholes 13 of each type of railroad rail, is mounted before drilling on the upper surface of the railroad rail 8 to be drilled so as to be readily removable. A clamp screw 14 having a rotating handle 14*a* is threaded vertically down through a tapped cylinder 7*b* on the upper end of clamp arm 7 over the axial center of cutter 2.

The lower end 14*c* of clamp screw 14 is aligned with a specific countersink 21 on pitch gauge 20 and tightened to secure the clamp means in position, and significant pressure is perpendicularly maintained from above and below as well as in a horizontal direction on railroad rail 8 by the clamp means. Retaining plate 15 is secured on the back ends of slide shafts 5, 5. A link mechanism 16, for advancing and retracting main body case 1 using retaining plate 15 as a support point and having a rotating handle 16*a*, is positioned between main body case 1 and retaining plate 15. Cutter 2, mounted on output shaft 4, is advanced by rotation of the handle of link mechanism 16 to drill a bolthole 13 in the middle of the rail 8*a* at a specified height and a specified pitch.

DESCRIPTION OF THE PREFERRED EMBODIMENT

Figure 1:
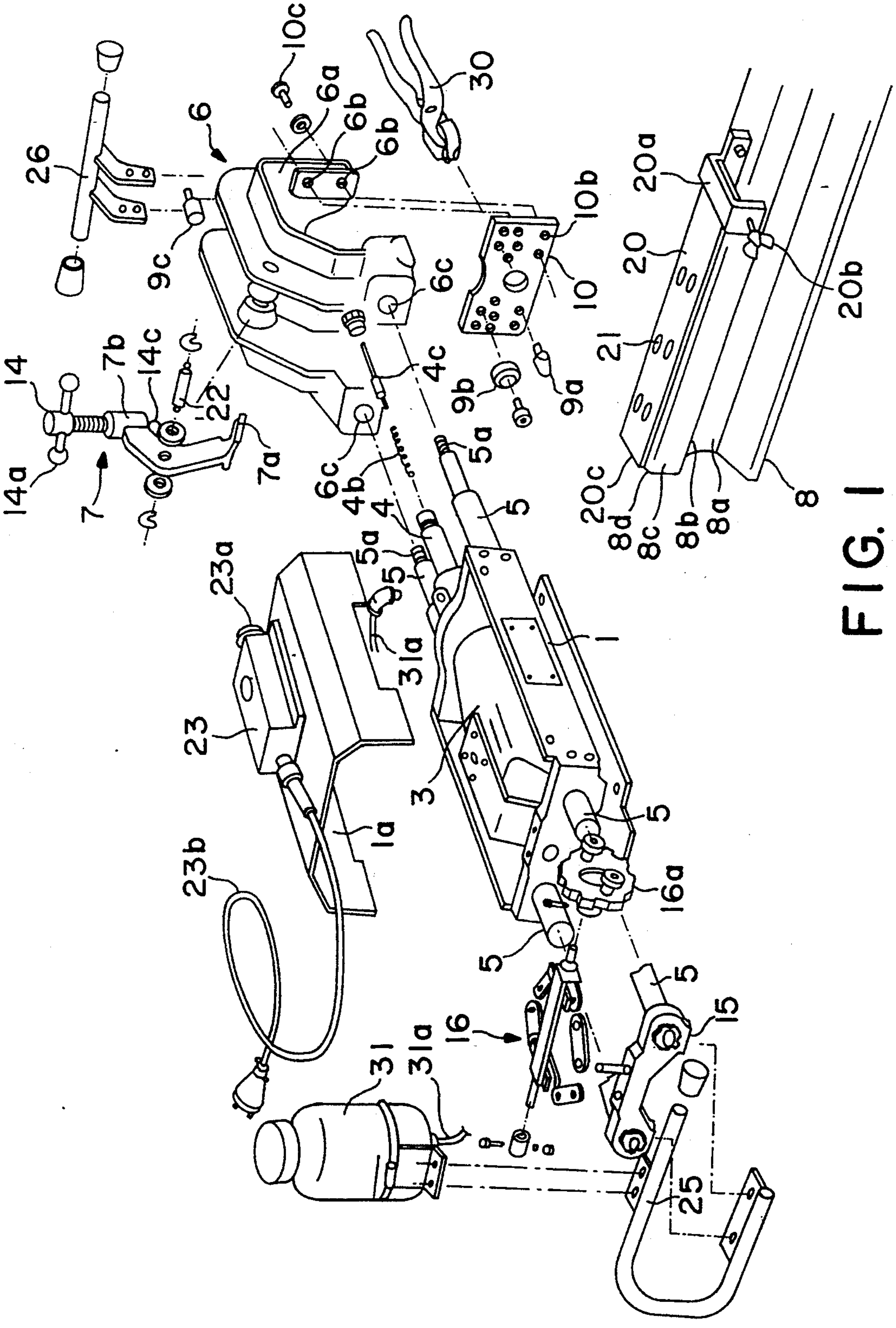
FIG. 1 is an exploded perspective view of the drilling machine of the present invention.
Figure 7:
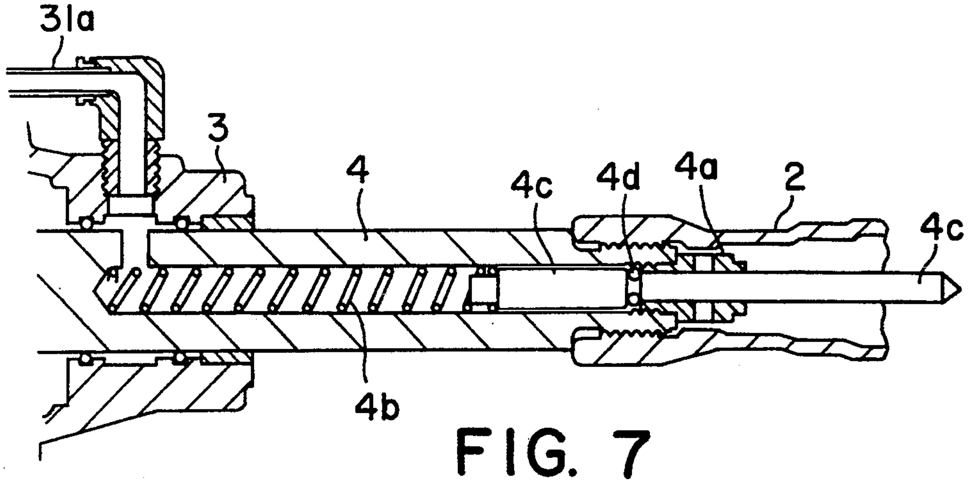
FIG. 7 is a longitudinal section of the cutter mount portion of the drilling machine of the present invention.

In FIG. 1, a main body case is denoted by 1. Rotating drive source 3 is secured by the electric motor of hole-drilling cutter 2 in the main body case 1. Output shaft 4 of rotating drive source 3 extends outward from main body case 1. As shown in the expanded view of FIG. 7, in the mounting of cutter 2, a center pin 4*c* is inserted against coiled spring 4b into the inner cavity of output shaft 4. Center pin 4*c* is secured through O-ring 4*d* by the matching threads of center pin guide 4*a*. Cutter 2 is secured by tightening its threaded inner portion over the threaded portion provided on the exterior of the front end of output shaft 4.

Cutter 2 is capable of drilling with high efficiency through a railroad rail with a metal borer having a blade on the outer perimeter of the front end of a cylinder. Although an engine drive or the like is suitable as rotating drive source 3, the present embodiment employs a motor drive. Cutting oil is supplied from a lubricant tank 31 positioned on the back of main body case 1, via a tube 31*a*, to the inside of output shaft 4. During drilling, cutting oil is forced into the forward perimeter of cutter 2 through center pin 4. A pair of pliers 30 is used to remove cores that have not been successfully ejected from cutter 2.

The top of the main body case is covered by a cover 1*a*, which is secured by screws. On top of cover 1*a* is positioned switch 23*a* and control box 23, to which power cord 23*b* is connected.

On both sides of main body case 1 are secured slide shafts 5, 5, parallel with and centered about output shaft 4. The output shaft ends of slide shafts 5, 5 have threaded portions 5*a*, 5*a*, which are anchored with nuts in through-holes 6*c*, 6*c* of catch frame 6, which in turn is shaped roughly like the letter "U" when viewed from the side but positioned with the open side facing downward and having a lengthwise gap in its lower middle portion as viewed from main body case 1.

Clamp arm 7 is supported by a support shaft 22 allowing it to rotate freely in the lengthwise gap in the middle portion of catch frame 6. A means of clamping is configured by opposing gripping surface 6*a* on catch frame 6 and hook member 7*a* on the bottom of catch arm 7 to cross clamp railroad rail 8 on two sides. However, hook member 7*a* is formed with two tines (not shown) to keep from interfering with the advance of cutter 2, described further below.

Figure 2:
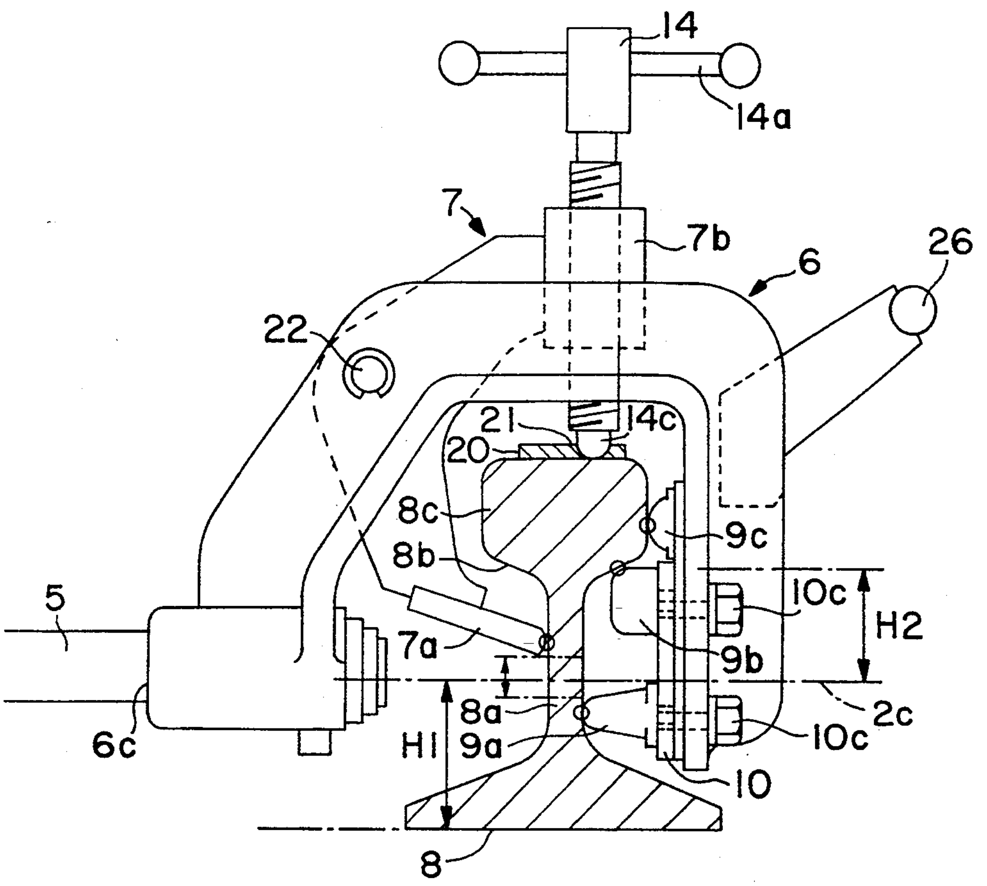
FIG. 2 is a side view of the clamp means of the present invention.

A single upper rail support 9*c* is secured so as to face inward on the upper middle inner section of gripping surface 6*a* of catch arm 6. Height gauge 10 is secured below upper rail support 9*c* so as to be readily detachable. As shown in FIGS. 1 and 2, height gauge 10 is secured by inserting bolts 10*c*, 10*c*, etc. from the outer side of gripping surface 6*a* through insertion holes 6*b*, 6*b*, etc., drilled in four spots on gripping plate 6*a* on catch frame 6, and tightening the bolts into threaded holes 10*a*, 10*a*, etc. tapped in the four corners of height gauge 10.

Figure 5:
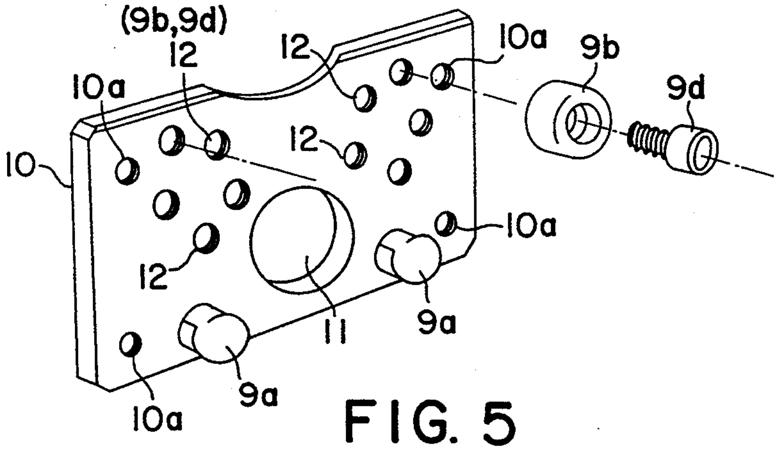
FIG. 5 is a perspective view of the height gauge of the present invention.
Figure 6:
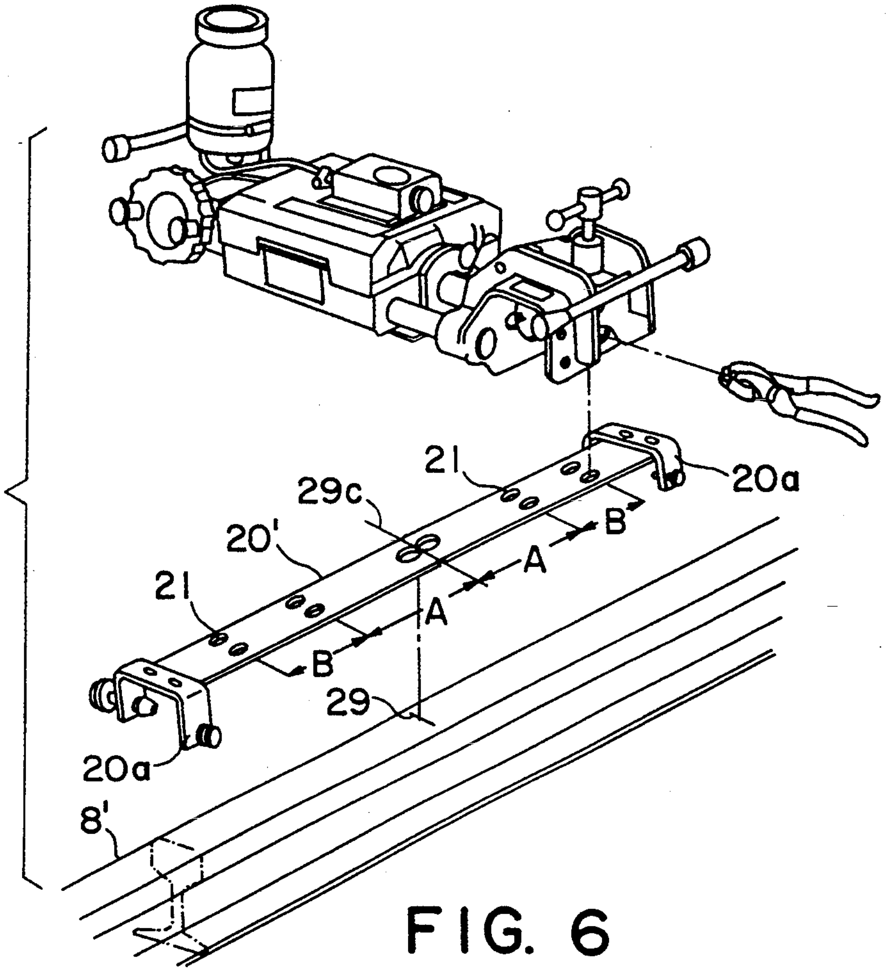
FIG. 6 is a perspective view of the complete drilling machine of the present invention showing its positioning relative to the pitch gauge mounted on a railroad rail of a Shinkansen, i.e., a vehicle popularly referred to as the "Bullet Train".

As shown in FIG. 5, in addition to threaded holes 10*a*, 10*a*, etc., used to secure height gauge 10, medial rail supports 9*a*, 9*a* are secured on the lowermost portion of height gauge 10, parallel to each other and separated by a gap, and through-hole 11 is drilled in approximately the center of gauge 10.

Numerous screw holes 12, 12, etc., corresponding to the different types of rails, are also positioned on height gauge 10 so that its left side is symmetrical to its right. A type of rail is indicated for each of screw holes 12, 12, etc. Prior to drilling, two upward rail supports 9*b*, 9*b* are secured in a parallel manner by threading bolts 9*d*, 9*d* in the screw holes 12, 12 corresponding to the type of rail to be cut.

As shown in FIG. 2, clamp screw 14 having a rotating handle 14*a* is threaded vertically down through tapped cylinder 7*b* positioned on the upper end of clamp arm 7 over the axial center of cutter 2 which advances perpendicularly with respect to railroad rail 8. By aligning the lower end 14*c* of clamp screw 14 with a specific countersink 21 on above-mentioned pitch gauge 20 and tightening down clamp screw 14, as well as rotating clamp arm 7 about support shaft 22 so that pressure is maintained on the middle part of the rail 8*a* by rotating hook member 7*a*, significant pressure is perpendicularly maintained from above and below and in a horizontal direction on railroad rail 8.

As shown in FIG. 2, when railroad rail 8 is clamped in this manner, upward rail supports 9*b*, 9*b* support the upper bulge of the rail 8*b* against pressure applied by the tightening of clamp screw 14, and the support point of the upper bulge of the rail 8*b* is at a fixed distance H2 from the center of drilling 2*c*.

In this manner, the drilling height H1 from the bottom of railroad rail 8 is determined by the clamping position of the upper bulge of the rail 8*b*.

Figure 3:
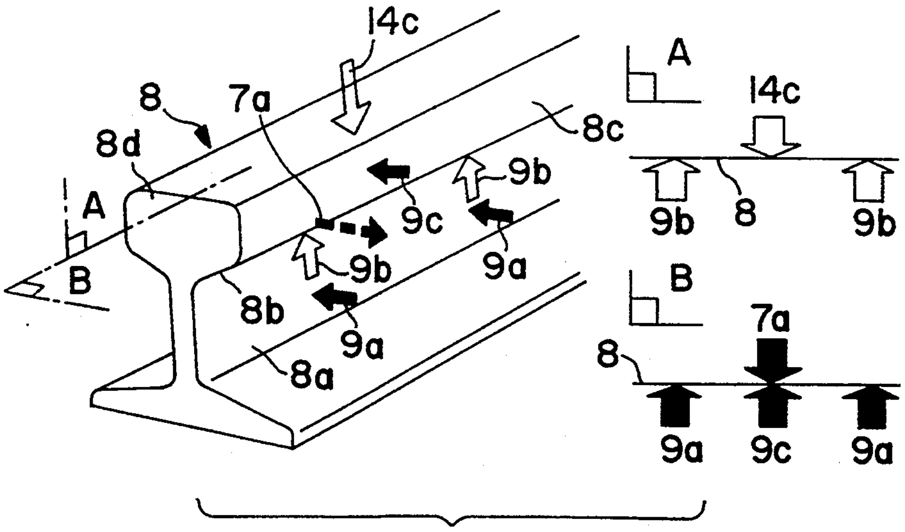
FIG. 3 shows drawings describing the clamp configuration of the clamp means shown in FIG. 2 on the railroad rail.

In this method of clamping, in the positions and directions of support shown by arrows in FIG. 3, the middle part of the rail 8*a* is horizontally supported at two points by medial rail supports 9*a*, 9*a*. The upper bulge of the rail 8*b* is horizontally supported, at two points, by upward rail supports 9*b*, 9*b* and the side of the upper part of the rail 8*c* is supported, at one central point, by upper rail support 9*c*. The various lengths of medial rail supports 9*a*, 9*a*, upward rail supports 9*b*, 9*b*, and upper rail support 9*c* are such that gripping surface 6*a* of catch arm 6 is held in uniform vertical contact with railroad rail 8.

As shown in FIG. 2, a vertical line passing through the center of clamp screw 14 and projected downward through its lower end 14*c* is approximately equidistant from the contact points with the rail of medial rail supports 9*a* and upward rail supports 9*b*, permitting stable tightening of clamp screw 14.

Figure 4A:
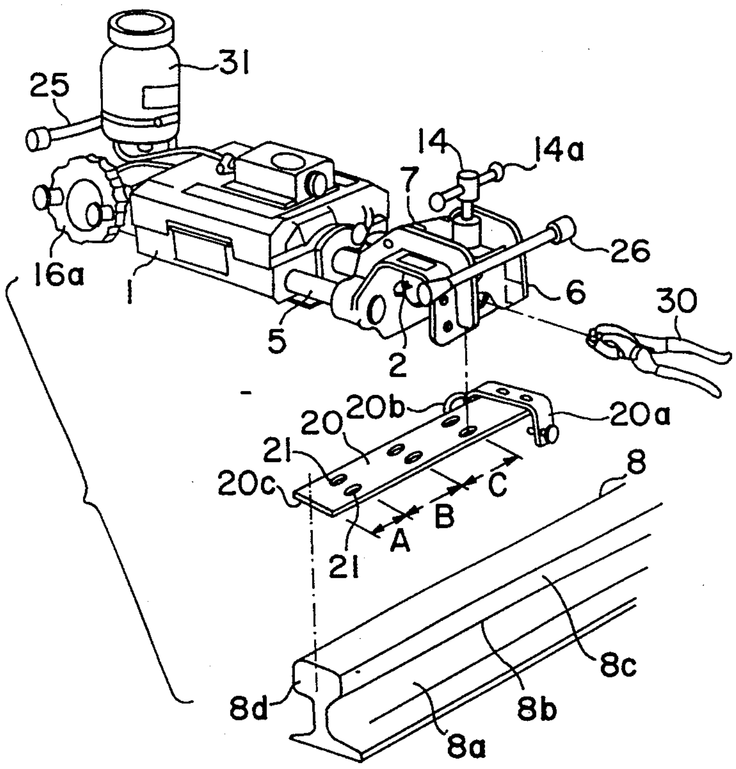
FIG. 4(*a*) shows a perspective drawing of the complete drilling machine of the present invention as well as its positioning relative to the pitch gauge mounted on a conventional rail, and FIG. 4(*b*) is a side view of a railroad rail showing the relative positioning of boltholes drilled in the middle part of the rail.
Figure 4B:
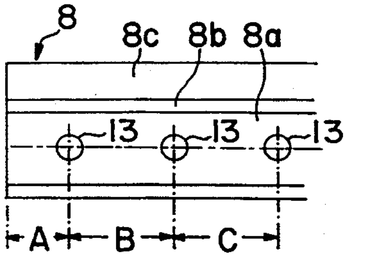

As shown in FIG. 4, end face 20*c* of pitch gauge 20 is aligned with end face 8d of railroad rail 8 when mounting pitch gauge 20 on the upper surface of railroad rail 8. Pitch gauge 20 comprises a clamping strip 20*a* that can be fit over the width of railroad rail 8 and is attached on one end of a flat plate. A screw 20*b* having a winged tightener is positioned on one side of clamping strip 20*a*, permitting screw 20*b* to be tightened against the side of the upper part of the rail 8*c*. Countersinks 21, 21, etc. are positioned on the surface of the flat plate of pitch gauge 20 at distances measured from end surface 20*c* and corresponding to the drilling positions of boltholes 13. Countersinks 21 are positioned crosswise in pairs so that the lower ends 14*c* of pairs of clamp screws 14 can be tightened down over railroad rail 8 on the countersinks.

When the railroad rail to be repaired is a Shinkansen rail 8′, a pitch gauge for use on the Shinkansen track is first made by abutting the end surfaces 29*c* of two of the above-described pitch gauges 20. The center 29*c* of the pitch gauge is then aligned with the cracked portion 29 of the rail and the gauge seated on the rail. Countersinks 21, 21, etc. are also provided in the same manner on a pitch gauge 20′ for use on Shinkansen rails which is clamped in a manner identical to that described above.

Retaining plate 15 is secured on the rear ends of slide shafts 5, 5 to the rear of main body case 1. Link mechanism 16 with attached rotating handle 16*a* is secured between retaining plate 15 and main body case 1.

Main body case 1 can be moved forward and backward by rotating the handle of link mechanism 16. Boltholes 13 are drilled at a specified height and a specified pitch in the middle part of the rail 8*a* by advancing cutter 2, mounted on output shaft 4, between the tines of hook member 7*a* of clamp arm 7. Handles 25, 26, used to transport the drilling machine, are mounted behind main body case 1 and on the front of clamp case 6, respectively.

As part of the drilling process, upward rail supports 9*b*, 9*b* are secured in the threaded holes 12, 12 appropriate for the type of rail in order to set the drilling height of the bolthole 13 to be drilled. Clamp screw 14 is then tightened onto one of the countersinks 21 on pitch gauge 21 which has been mounted on top of railroad rail 8 and a bolthole 13 is drilled in the middle part of the rail 8*a* by the rotating drive of cutter 2 when the cutter is advanced. Clamp screw 14 is then released and retightened on the next countersink 21 and the drilling repeated in this manner a specified number of times to make boltholes 13 of a specified pitch and a specified height.

After drilling a hole, the core in cutter 2 is ejected by center pin 4 which is driven by coiled spring 4*b*, but spring-powered ejection is sometimes incomplete due to abrasion with cutter 2 and the like. At such times, the ends of pliers 30 are inserted from the exterior through through-hole 11 to grip the outer edge of the core in cutter 2 and extract it.

As described above, in the railroad rail drilling machine of the present invention, the upper bulge of the rail is secured by the specific positioning of the height gauge corresponding to the type of rail to be drilled and a pitch gauge is mounted on a specific position on the rail. By simply tightening a clamp screw onto a countersink on the pitch gauge, the drilling machine is firmly and perpendicularly secured in position from above and below as well as horizontally, and the pitch and height of the bolthole drilling position are set. Once a drilling machine of this type has been clamped in position, drilling is carried out by simply rotating a handle to advance a rotating cutter.

Accordingly, drilling can be completed in an extremely easy and rapid manner without marking and punching each position on the rail.

I claim:

1. A drilling machine for drilling a railroad rail comprising:

a rotating drive source;

a cutter for drilling to which said rotating drive source is attached;

a main body case in which said rotating drive source is housed;

an output shaft extending outward from said main body case;

slide shafts positioned on sides of said main body case, said rotating drive source being centered between said slide shafts;

a clamp arm provided with a support shaft permitting said clamp arm to move freely;

a catch frame, secured on two output shaft ends of said slide shafts, opposite said clamp arm;

a clamping means, including a gripping surface of said catch frame and a hook member, below said clamp arm, opposed to said gripping surface, for gripping a railroad rail crosswise and from both sides;

an upper rail support facing inward and secured on the inside of said gripping surface of said catch frame;

a height gauge, with a through-hole drilled approximately in its center, bolted to the gripping surface;

two medial rail supports juxaposed on said height gauge and separated by a gap;

upward rail supports threaded in screw holes in said height gauge to position the upward rail supports on said height gauge according to designated drilling heights of boltholes for each type of railroad rail;

a pitch gauge, on which numerous countersinks are positioned in relation to one of an end of and a specified spot on said railroad rail so as to correspond to a pitch designated for boltholes of each type of railroad rail, readily removably mounted, before drilling, on the upper surface of said railroad rail;

a clamp screw, having a rotating handle, threaded vertically down through a tapped cylinder on an upper end of said clamp arm and over an axial center of said cutter, a lower end of said clamp screw being aligned with a specific countersink on said pitch gauge and tightened to secure the clamp means in position, significant pressure being perpendicularly maintained from above and below as well as in a horizontal direction on said railroad rail by the clamp means;

a retaining plate secured on back ends of said slide shafts; and a link mechanism, having a rotating handle, for advancing and retracting said main body case using said retaining plate as a support point, said link mechanism positioned between said main body case and said retaining plate;

said cutter being mounted on said output shaft and advanced by rotation of the rotating handle of said link mechanism to drill one of said boltholes in the middle of the rail at a specified height and a specified pitch.

* * * * *